A. Rutenfranz,
Grain-Drill.
No. 85,966. Patented Jan. 19, 1869.
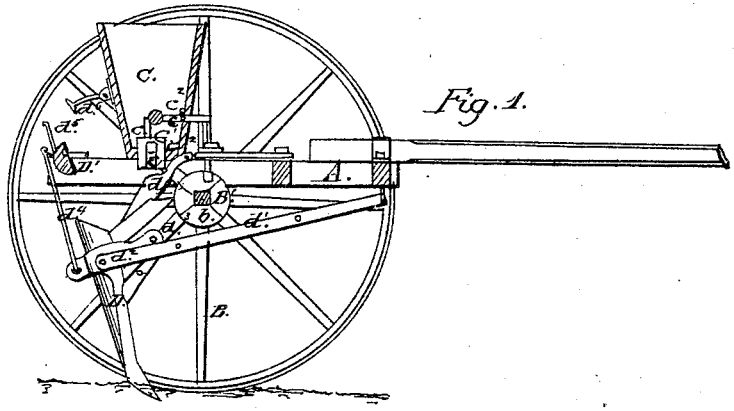
Fig. 1.
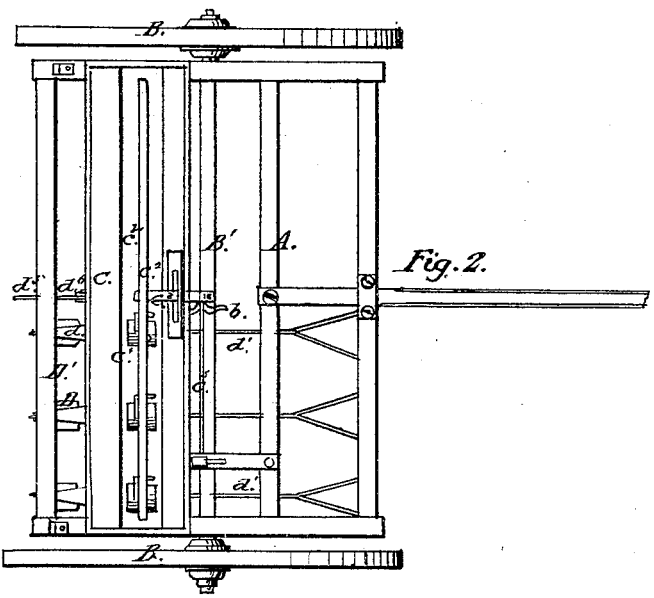
Fig. 2.
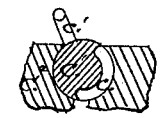
Detail of Dropper.
Witnesses:
Geo. W. Orkel Jr.
Geo. W. Herbert
Inventor:
A. Rutenfranz
by M. Randolph & Co
Attys.

ARNOLD RUTENFRANZ, OF HAMMONDSTOWN, ILLINOIS.

Letters Patent No. 85,966, dated January 19, 1869; antedated December 31, 1868.

IMPROVEMENT IN SEED-DRILL.

The Schedule referred to in these Letters Patent and making part of the same.

*To all whom it may concern:*

Be it known that I, ARNOLD RUTENFRANZ, of Hammondstown, in the county of St. Clair, and State of Illinois, have made certain new and useful Improvements in Seed-Drills; and I do hereby declare that the following is a full and clear description thereof, reference being had to the accompanying drawings, and to the letters of reference marked thereon.

This invention relates, first, to the dropping-device, and, secondly, to the arrangement for raising up the drill-teeth.

To enable those skilled in the art to make and use my improved drill, I will proceed to describe its construction and operation.

Figure 1 of the drawings is a sectional elevation of the improved drill.

Figure 2 is a general plan of the same.

There is also a detail drawing of the seed-dropper.

The drill-frame A is mounted on the wheels B, which are connected by the revolving shaft B'.

On top of the frame A is the seed-box C, in the bottom of which, at regular intervals, are placed the seed-droppers, which are balls, $C^1$, with grooves, $c$, cut in their peripheries, and fitted in sockets in the bed-piece $C^2$ of the hopper or seed-box.

The arrangement of these ball-droppers is clearly shown in the detail drawing, in which are also represented the short levers $c^1$, by which the said balls are turned over, so as to expose their upper ends to the seed-box, from which they receive the seed sufficient for once dropping, and then they are turned over in the opposite direction, so as to throw the seed down through the tubes $d$ into the hollow teeth D.

The upper ends of the levers $c^1$ are attached to the rod $c^2$, which extends the entire length of the hopper, and is operated in a reciprocating motion (longitudinally) by means of the lever $c^3$ and corrugated cam $b$ on the axle B'.

The drill-teeth D are attached to the draught-rods $d^1$ by small iron swivel-pins $d^2$ and wooden pins $d^3$, the latter being allowed to break, when the point of the tooth encounters an obstacle, and the swivel-pin allowing the tooth to turn up backward until the obstacle shall have been passed over.

Cords or chains, $d^4$, connect the teeth D with the roller D', which is secured to the back of the seed-box, and the lever $d^5$ projecting from the said roller (within easy reach of the driver upon the box C) may be seized by the driver and hooked under the hook $d^6$, thereby turning the roller over, so as to raise the drill-teeth up out of the ground, and retain them in that position when not required in planting.

Having thus described my invention,

What I claim, is—

The seed-dropper $C^1$, operating rod $c^2$, lever $c^3$, and corrugated cam $b$, when combined and arranged as herein described and set forth.

In testimony of which invention, I hereunto set my hand, in presence of—

ARNOLD RUTENFRANZ.

Witnesses:
M. RANDOLPH,
GEO. P. HERTHEL, Jr.